United States Patent
Lin et al.

(10) Patent No.: US 6,421,748 B1
(45) Date of Patent: Jul. 16, 2002

(54) SYSTEM AND METHOD FOR A UNIVERSAL OUTPUT DRIVER

(75) Inventors: Jo-Tsen Lin; Wei-Chuan Li, both of Hsinchu; Chang-Chen Chen, Taipei; Chien-Wen Chen, Taichung; Hsin-Yu Lin, Hsinchu; Wang-Hsing Huang, Tainan, all of (TW)

(73) Assignee: Nadio.com, Inc., Fremont, CA (US)

(*) Notice: Subject to any disclaimer, the term of this patent is extended or adjusted under 35 U.S.C. 154(b) by 0 days.

(21) Appl. No.: 09/034,294

(22) Filed: Mar. 4, 1998

(51) Int. Cl.7 ............................................... G06F 13/14
(52) U.S. Cl. ................................. 710/65; 710/8; 710/15; 358/1.15; 358/1.9
(58) Field of Search ............................ 710/8, 15, 65; 358/1.15, 1.9

(56) References Cited

U.S. PATENT DOCUMENTS

| | | | | |
|---|---|---|---|---|
| 4,716,543 A | * | 12/1987 | Ogawa et al. ............ 364/926.5 |
| 5,604,843 A | * | 2/1997 | Shaw et al. ................. 395/101 |
| 5,771,360 A | * | 6/1998 | Gulick ....................... 710/128 |
| 5,799,206 A | * | 8/1998 | Kitagawa et al. ............ 710/36 |
| 5,828,855 A | * | 10/1998 | Walker ....................... 710/129 |
| 5,867,633 A | * | 2/1999 | Taylor, III et al. .......... 395/109 |
| 5,881,213 A | * | 3/1999 | Shaw et al. ................. 395/114 |
| 5,960,168 A | * | 9/1999 | Shaw et al. ................ 358/1.15 |

* cited by examiner

Primary Examiner—Jeffrey Gaffin
Assistant Examiner—Abdelmoniem Elamin
(74) Attorney, Agent, or Firm—Bever, Hoffman & Harms, LLP; Jeanette S. Harms (57) ABSTRACT

The inventive system and method simulate the actions of a selected output device driver, and then record all the request and information for the document output. The quality and size of the document output are optimized according to the properties of the selected output device driver and supported resources before it is sent to the selected remote output device. When the document output data is sent to the remote site, it is restored and converted to a format acceptable by the selected output device driver for outputting a document of desired format and quality. The inventive method and system for the universal output driver facilitate the operations of network outputting so that a local host does not have to install the driver of the selected driver. Moreover, the invention can optimize the document output in accordance to the properties of the selected output device, thereby to ensure the quality of the document output and increase the transmission speed.

21 Claims, 8 Drawing Sheets

SYSTEM AND METHOD FOR A UNIVERSAL OUTPUT DRIVER

BACKGROUND OF THE INVENTION

A. Field of the Invention

The present invention relates to a system and method for a universal output driver, especially to a universal output driver existing in a computer network for exempting a local host computer from installing the driver of a selected output device.

B. Description of the Prior Art

Outputting a document from a remote output device, such as printer, viewer, overhead projector, or fax machine, has been an essential part in office automation. A document can be conveniently sent from a local host computer to a remote output device via Local Area Networks, Wide Area Networks or Internet either for printing or viewing. For this purpose, the driver of a selected output device must be installed in a local host machine before the document can be outputted at the remote site in a desired format.

When the document is sent to the remote site, the local host computer conducts a handshaking with the driver of the selected output device for converting the document to the format acceptable by the remote output device driver. In such cases, the local host computer has to install various drivers depending on what output device has been selected. The disadvantage is that when a user selects a desired output device, which may be a laser printer, a dot printer, an overhead projector, a viewer, or a fax machine, the local host computer may not always have the proper driver available. Moreover, since the conversion is handled in the local computer before transmission, the data size usually will increase. Consequently, the transmission time will inevitably increase.

SUMMARY OF THE INVENTION

Accordingly, it is an object of the present invention to provide a system and method for a universal output driver which can simulate the driver of a selected output device in a computer network without having to actually install the selected output device driver in a local host machine, thereby to simplify the operations of the document output.

It is another object of the present invention to provide a system and method for a universal output driver which can optimize a document output according to the properties of a remote output device and supported resources before transmission, thereby to minimize the data size and the transmission time.

Briefly described, the present invention encompasses a system and method for a universal output driver. The inventive system and method simulate the actions of a selected output device driver, and then record all the request and information for the document output. The quality and size of the document output are optimized according to the properties of the selected output device driver and supported resources before it is sent to the selected remote output device. When the document output data is sent to the remote site, it is restored and converted to a format acceptable by the selected output device driver for outputting a document of desired format and quality. The inventive method and system for the universal output driver facilitate the operations of network outputting. Moreover, the invention can optimize the document output in accordance to the properties of the selected output device, thereby to ensure the quality of document output and increase the transmission speed.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

The invention illustrates a universal driver capable of simulating the actions of any selected output device driver by recording the request and information of a document output when communicating with a user application program. The quality and data size of the document output are optimized according to the properties of the selected output device driver and supported resources before being sent to a remote site. After the optimized data of the document output is received by the remote host computer, the data will be restored back to the format acceptable by the selected output device for outputting.

Figure 1:
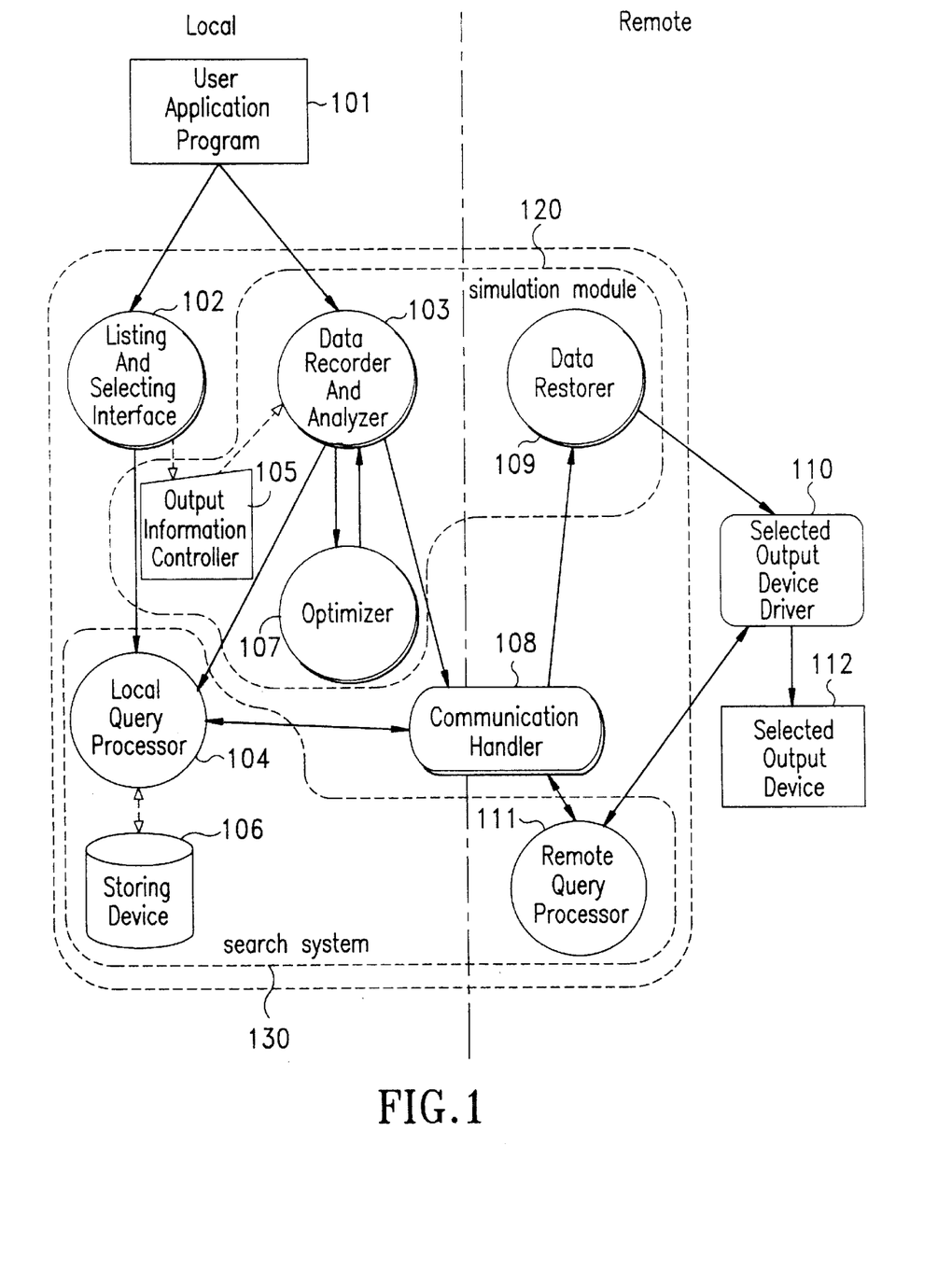
FIG. 1 is a schematic diagram showing the architecture of the inventive system according to the preferred embodiment of the invention.

The architecture of the inventive system is illustrated in FIG. 1 which mainly includes: a listing and selecting interface 102; a simulation module 120 which includes data analyzer and recorder 103, a data restorer 109; and a data optimizer 107; and communication handler 108.

In a computer network, there exists at least a local host computer, a remote host computer, and multiple output devices communicating to the local host computer and the remote host computer via network systems. A user application program 101 installed at the local host computer (not shown) can invoke a listing and selecting interface 102 in the same way as it, calls a local output driver. The listing and selecting interface 102 provides an interface for displaying all available output devices accessible in the network, such as printers, overhead projectors, viewers, and fax machines. When the network address of the output location is set up, the communication handler 108 can establish connections to the remote output device locating at the specified network address. Then, the properties of the selected output device drivers can be obtained from the remote site so that the properties are completely transparent to the listing and selecting interface 102. The listing and selecting interface 102 can then select any desired property for the document output, such as, paper size, resolution, number of copies, etc., as if the output device driver is installed in the local host computer.

When the user application program 101 is conducting a handshaking with the selected output device driver for processing the document output, the data recorder and analyzer 103 records all the requests and information necessary for outputting the document, and reads the information about the settings and properties for the document output from output information controller 105. After the data type of the document output is determined, data recorder and analyzer 103 will begin to record the request and information of the document output. The data recorder and analyzer 103 will analyze the request and information to determine if a further optimization process is needed. If the document output needs a further optimization, the document output will be sent to the optimizer 107. The information about the output format, size, and number of copies, will be stored in the output information controller 105 for the data recorder and analyzer 103 to read.

Since the output devices in a network may constantly updated, the invention uses a searching system for searching any available output driver, whether it is a laser printer, a dot printer, a fax machine, a viewer, or an overhead projector. The search system 130 mainly includes a local query processor 104, a storing device 106, and a remote query processor 111. The local query processor 104 searches the selected output device driver available in the network. The search begins from looking for the data previously stored in the local storing device 106. If the data is found and up-to-date, the data about the selected output device driver will be retrieved and forwarded to the listing and selecting interface 102. If it is not found, the query will be sent to the remote query processor 111 for searching the correspondent output device in the remote site. After the driver is found, the properties of the selected output device and supported resources will be returned to the local query processor 104 via communication handler 108.

The data optimizer 107 compares the requirement of the document output with the properties and supported resources of the selected output driver. In case that the remote site will not have the supported resources required for document output, the data optimizer 107 will ask for further related information via communication handler 108 before initiating optimization processes. The optimization process is a compromising task between the desired qualities of document output and the properties provided by the selected output device. The primary purpose of the optimization process is to minimize the data size before transmission. The most common way to minimize the data size is data compression. The data will be compressed first before transmission. This will efficiently minimize the data size.

The data optimizer 107 can do more sophisticated processes. For instance, if the resolution provided by the remote output device is lower than the original document output, the resolution of the original document output can be reduced before transmission. For the same reason, if the remote output device only provides black and white images, the original document output can be converted into black and white images before transmission. There are several other reasons for data optimization, such as security reasons. In such cases, the data will be encrypted before transmission and then decrypted after received. Parallel transmission and processing is also adopted by the data optimizer 107 when the document output is determined to be in real-time mode.

After the optimization step is complete, the optimized document output is returned to data recorder and analyzer 103 to be transmitted to the remote site via communication handler 108. The communication handler 108 is responsible for establishing connections to the destination of the remote output device for obtaining available resources and information of the output device and transmitting the optimized output data to the remote site.

At the remote site, the communication handler 108 will forward the data it received to data restorer 109. The data restorer 109 will simulate the actions of the selected output device to restore and convert the optimized document output to its original format. The restored document output will be sent to the selected output device driver 110 for outputting from the selected output device 112 according to the original specified properties.

Figure 2:
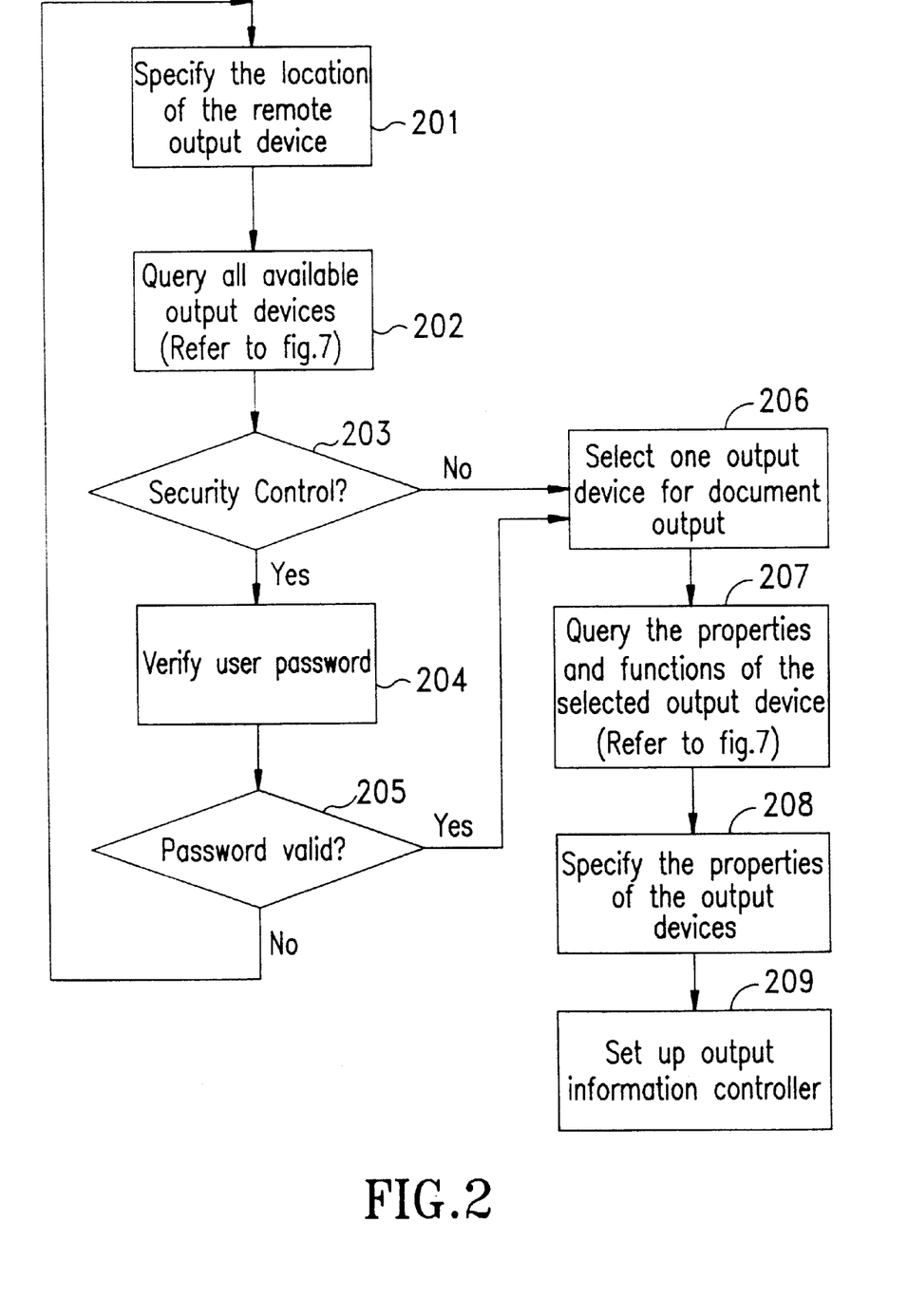
FIG. 2 is a flow chart showing the execution steps performed by the output device selector according to the preferred embodiment of the invention.

The execution steps of the above mentioned elements and module are discussed in detailed as follows:

Refer to FIG. 2 for the execution steps of the listing and selecting interface 102:

201: From the interface of a user application program, a user has to specify the location of the remote output device;

202: After the communication is established, the local query processor starts to query all output devices available at that location, e.g. printer, fax machine, viewer, overhead projector, etc., Refer to FIG. 7 for details;

203: Check if security control is required; if yes, go to step 204; otherwise, go to step 206;

204: Verify user password;

205: Check if the password is valid? if yes, go to step 206; if not, go to step 201;

206: From all the available output devices, select one for document output;

207: Query the properties and functions provided by the selected output device; refer to FIG. 7 for details;

208: Specify the properties of the output devices from the property listing of the selected output device;

209: Set up output information controller according to specified output format, such as document size, font, resolution, number of copies and color format etc.

Figure 3:
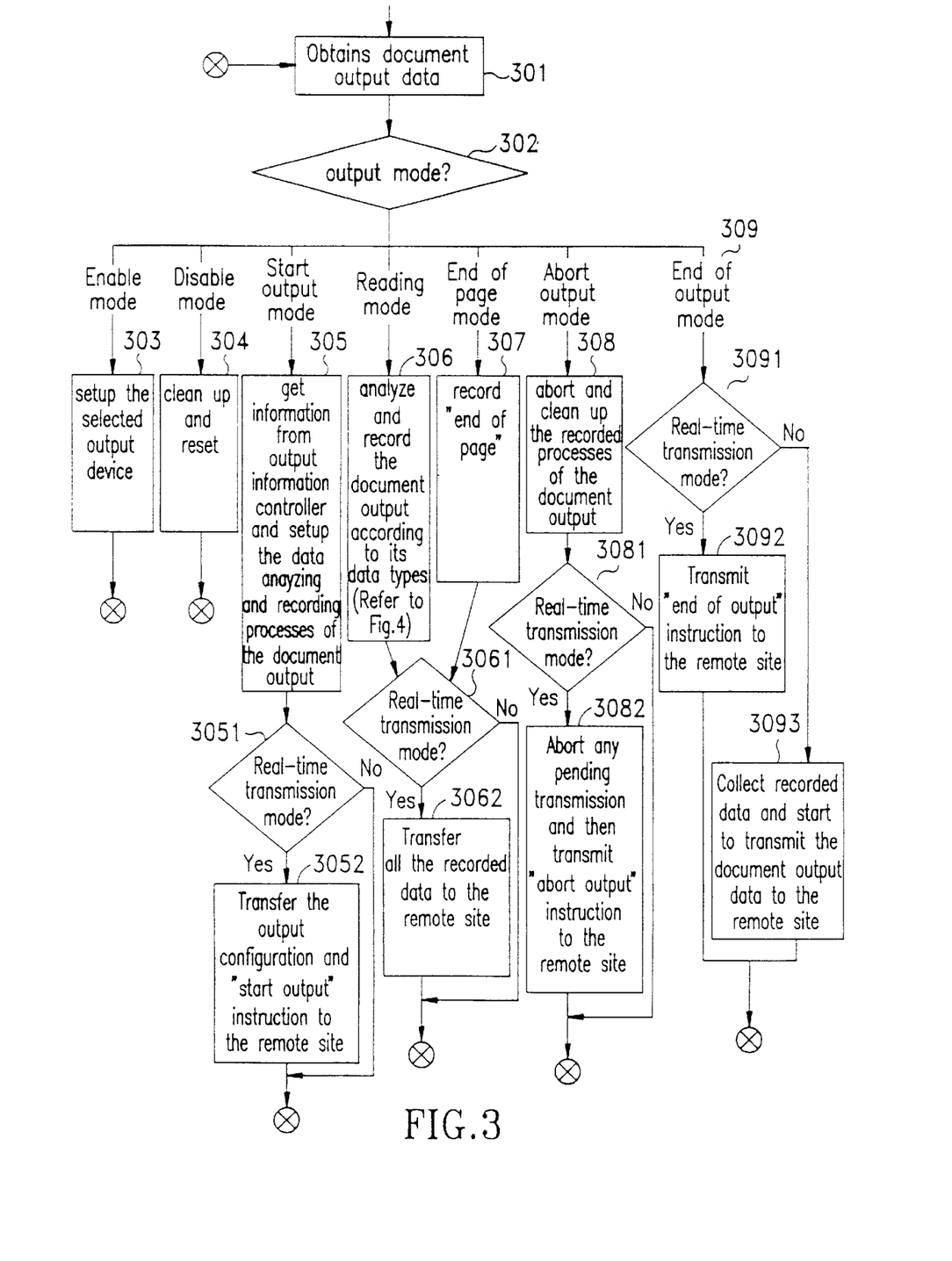
FIG. 3 is a flow chart showing the execution steps (1) performed by the data analyzer and recorder according to the preferred embodiment of the invention.
Figure 4:
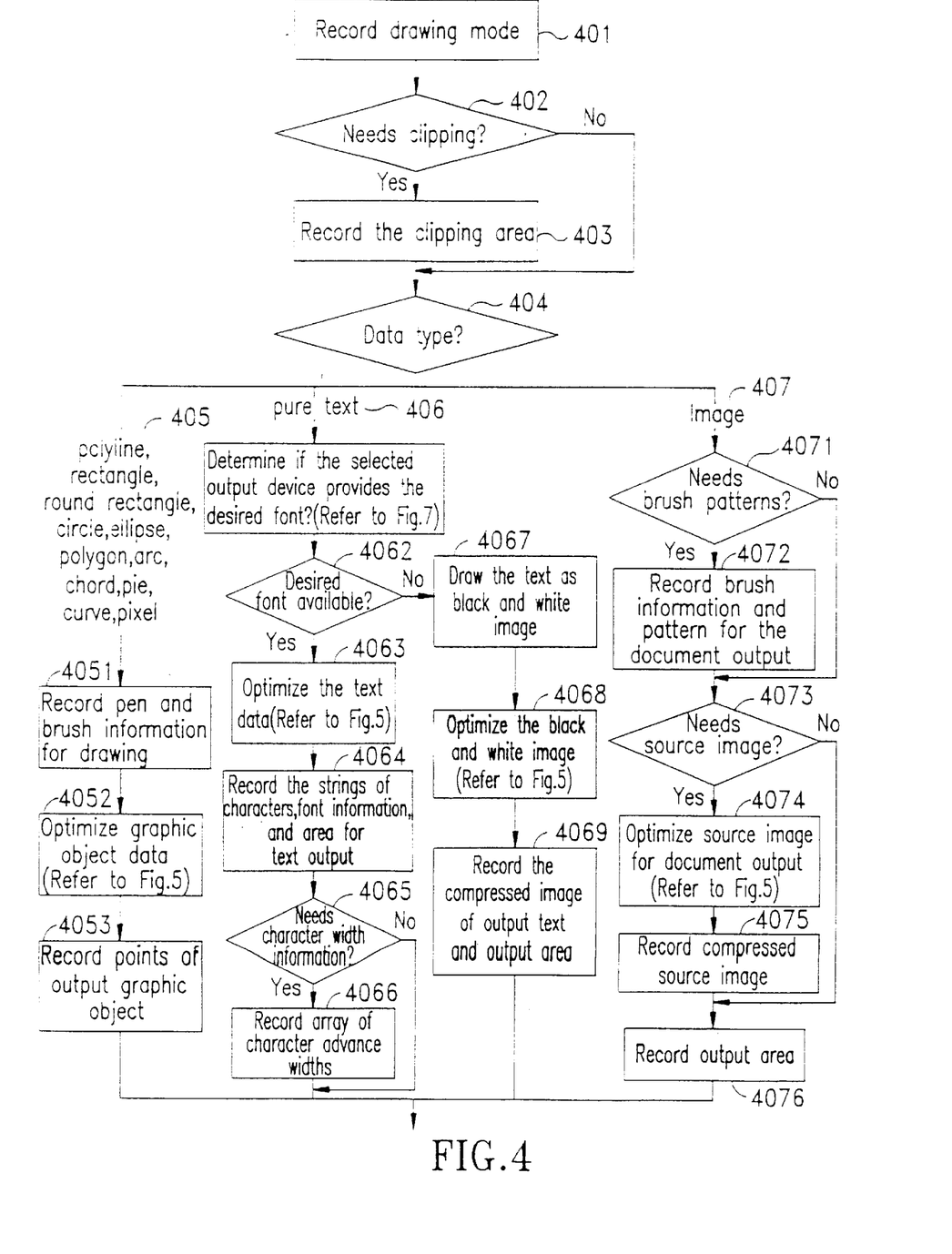
FIG. 4 is a flow chart showing the execution steps (2) performed by the data analyzer and recorder according to the preferred embodiment of the invention.

As soon as a user selects the desired properties for the document output, data analyzer and recorder 103 will start to record the request and information of the user application program. Refer to FIG. 3 and FIG. 4 for the detailed operations.

301: The data recorder and analyzer 103 obtains document output data;

302: Determine the data type of the document output. There are several possible modes: at enable mode, execute step 303; at disable mode, execute step 304: at start output mode, execute step 305; at reading mode, execute step 306; at end of page mode, execute step 307; at abort output mode, execute step 308; at end of output mode, execute step 309;

303: At enable mode, setup the desired properties and mode attributes of the selected output device; and then return to step 301;

304: At disable mode, clean up and reset the properties and mode of the selected output device; and then return to step 301;

305: At start output mode, get information from output information controller and setup the data analyzing and recording processes of the document output;

3051: Check if it is real-time transmission mode? If yes, go to step 3052; if not, return to step 301;

3052: Transferring the output configuration and "start output" instruction to the remote site; and then return to step 301;

306: At reading mode, analyzing and recording the document output according to its data types, such as graphics, text, and image; refer to FIG. 4 for details;

3061: Check if it is real-time transmission mode? If yes, go to step 3062, If not, return to step 301;

3062: Transferring all the recorded data to the remote site; return to step 301;

307: At end of page mode, record "end of page"; go to step 3061;

308: At abort output mode, abort and clean up the recorded processes of the document output;

3081: Check if it is real-time transmission mode? If yes, got to step 3082; if not, return to step 301;

3082: Abort any pending transmission and then transmit "abort output" instruction to the remote site;

309: At end of output mode, go to step 3091;

3091: Check if it is real-time transmission mode? If yes, go to step 3092; if not, go to step 3093;

3092: Transmit "end of output" instruction to the remote site; and then return to step 301;

3093: Collect recorded data and start to transmit the document output data to the remote site; and then return to step 301.

The analyzing step of step 306 includes the following steps. Refer to FIG. 4 for the detailed operations.

Figure 5:
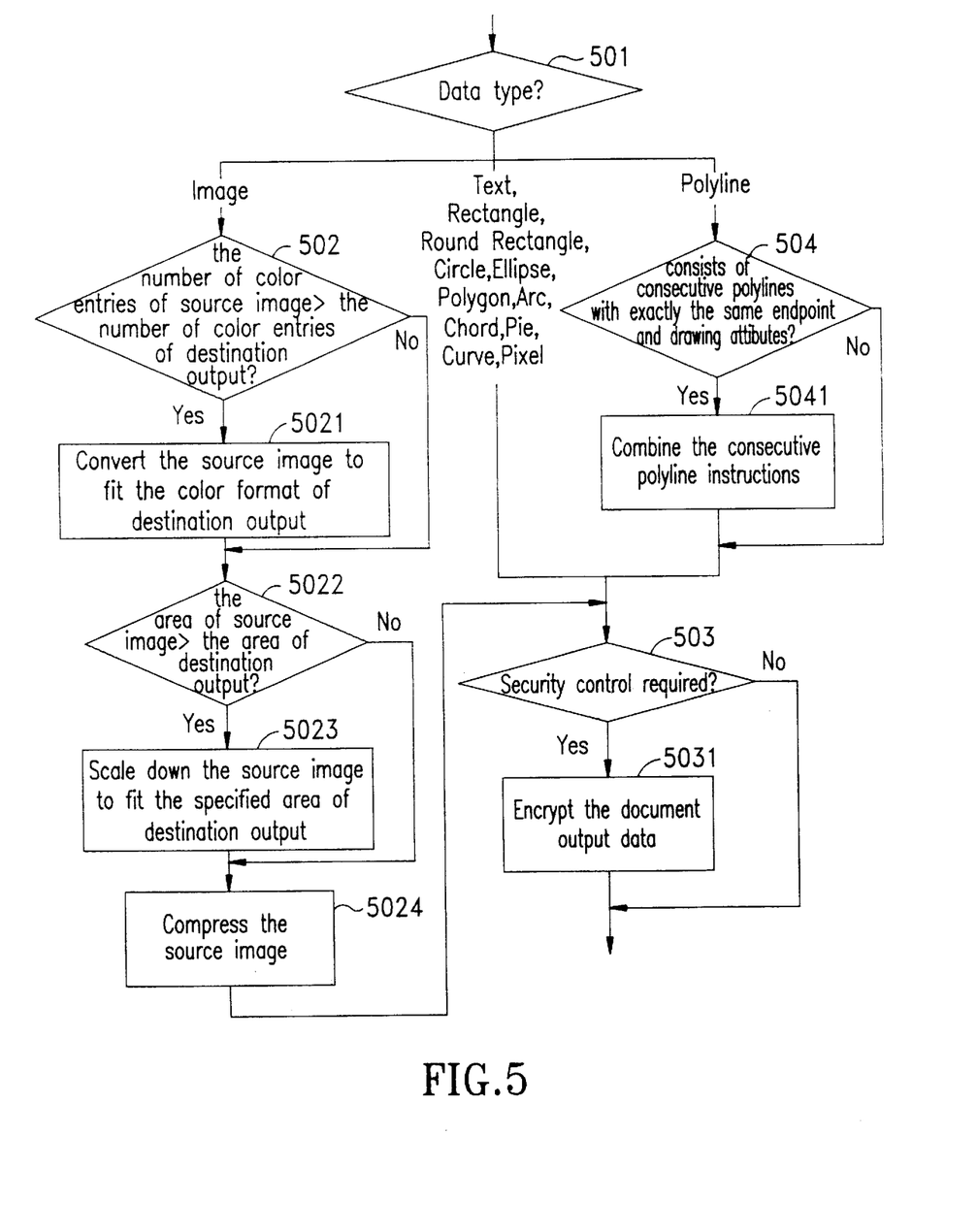
FIG. 5 is a flow chart showing the execution steps performed by the data optimizer according to the preferred embodiment of the invention.
Figure 7:
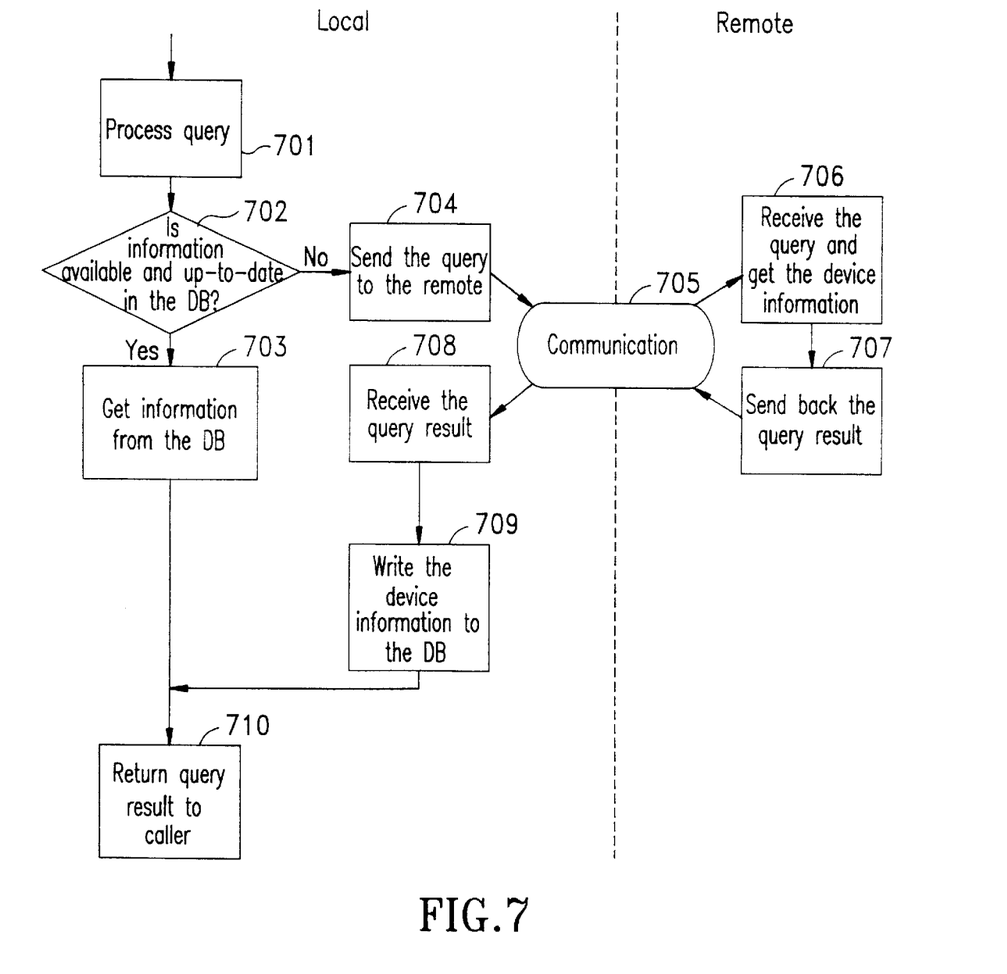
FIG. 7 is a schematic diagram showing the execution steps performed by the search system according to the preferred embodiment of the invention.

401: Record drawing mode;

402: Ask if the drawing needs clipping? If yes, go to step 403; if not, go to step 404;

403: If yes, record the clipping area;

404: Determine the data type of the document output. There are three output types: if it is graphics, execute step 405; if it is pure text, execute step 406; if it is image, execute step 407;

405: If it is polyline, rectangle, round rectangle, circle, ellipse, polygon, arc, chord, pie, curve, pixel, then execute the following steps:

4051: Record pen and brush information for drawing;

4052: Optimize graphic object data; Refer to FIG. 5 for details;

4053: Record points of output graphic object;

406: If the data type is pure text, execute the following steps:

4061: Query if the specified remote site has the desired font; Refer to FIG. 7 for details;

4062: Check if the desired font available on the remote site? If yes, go to step 4063; If not, go to step 4067;

4063: Optimize the text data; refer to FIG. 5 for details;

4064: Record the strings of characters, font information, and area for text output;

4065: Check if the text output needs character width information? If yes, go to step 4066;

4666: Record array of character advance widths;

4067: If the remote site does not have the requested font, then draw the text as black and white image;

4068: Optimize the black and white image; refer to FIG. 5 for details;

4069: Record the compressed image of output text and output area;

407: If it is image, then execute the following steps:

4071: Check if the document output needs brush patterns? If yes, go to step 4072; if not, execute step 4073;

4072: Record brush information and pattern for the document output;

4073: Check if the document output needs source image? If yes, go to step 4074; If not, execute step 4076;

4074: Optimize source image for document output; Refer to FIG. 5 for details;

4075: Record compressed source image;

4076: Record the specified output area.

Data recorder and analyzer 103 transmits the document output to the data optimizer 107 after the recording procedure is complete. Refer to FIG. 5 for the detailed steps.

The execution steps for optimization are illustrated in FIG. 5:

501: Determine the data type of the received document output. If the data type of the document output is image, execute step 502; if it is text, rectangle, round rectangle, circle, ellipse, polygon, arc, chord, pie, curve, pixel, etc. go to step 503; if it is polyline, execute step 504;

501: Compute if the number of color entries of source image is larger than the number of color entries of destination output? If yes, go to step 5021; if not, execute step 5022;

5021: Convert the source image to the color format of the selected output device;

5022: Compute if the area of source image is larger than the area of destination output? If yes, go to step 5023; If not, execute step 5024;

5023: Scale down the source image to fit the specified area of destination output;

5024: Compress the source image; and then go to step 503;

503: Check if the document output requires security control? If yes, go to step 5031; otherwise, return the data to the data recorder and analyzer;

5031: Encrypt, the document output data; then return the data to the data recorder and analyzer;

504: If it is polyline, check if it consists of consecutive polylines with exactly the same endpoint and drawing attributes? If yes; go to step 5041; if not, go to step 503;

5041: Combine the consecutive polyline instructions; go to step 503.

Right after the data optimizer 107 returns the optimized data back to the data recorder and analyzer 103, the data recorder and analyzer 103 will transmit the document output information to data restorer 109 via communication handler 108. The execution steps of the data restorer 109 after receiving the document output are illustrated in FIG. 6.

Figure 6:
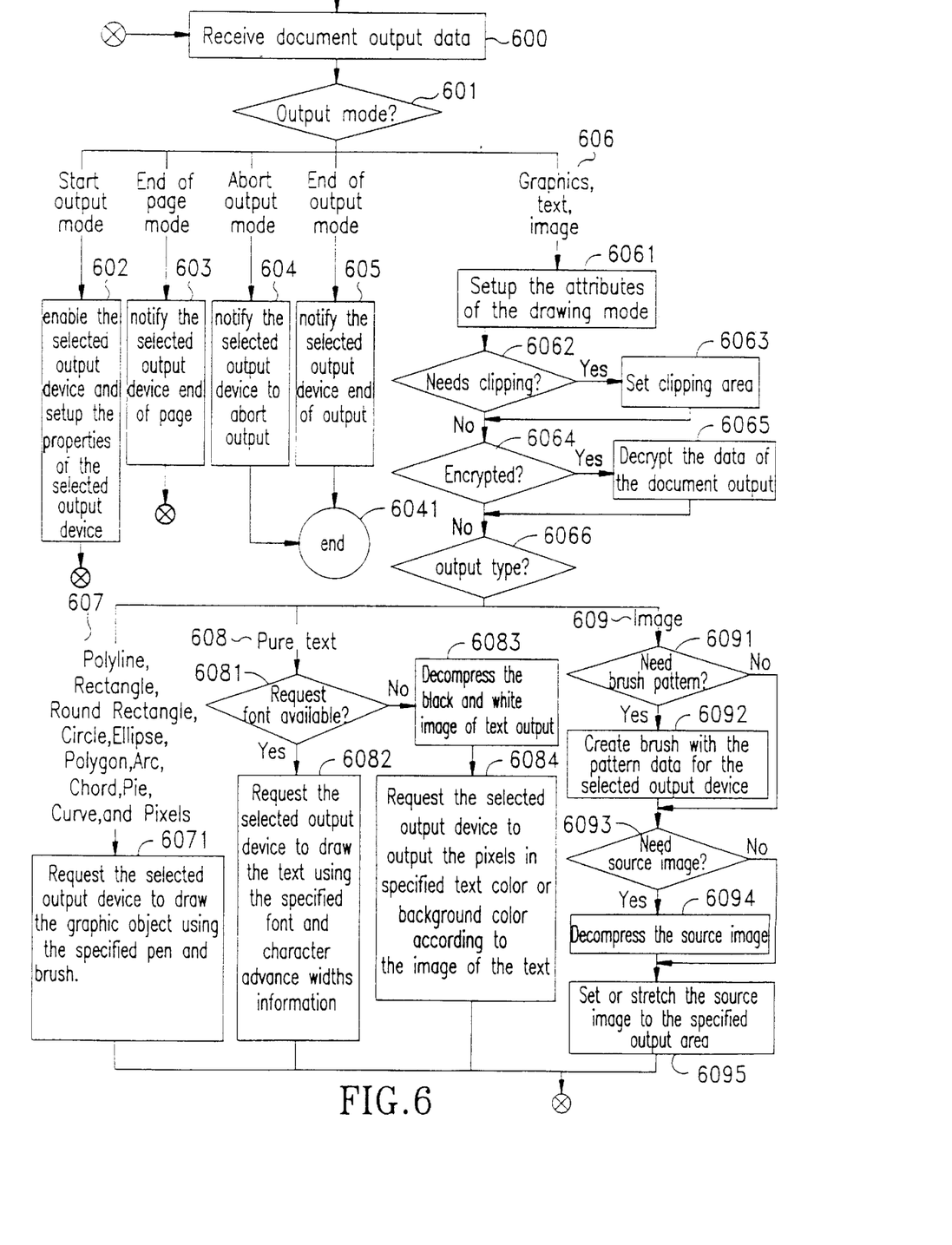
FIG. 6 is a flow chart showing the execution steps performed by the data restorer according to the preferred embodiment of the invention.

The execution steps of output restorer are illustrated in FIG. 6.

600: Receive document output data;

601: Determine the output mode. There are five output modes: at start output mode, execute step 602; at end of page mode, execute step 603; at abort output mode, go to step 604; at end of output mode, execute step 605; at graphics, text, image output mode, execute step 606;

602: At start output mode, enable the selected output device and setup the properties of the selected output device;

603: At end of page mode, notify the selected output device end of page;

604: At abort output mode, notify the selected output device to abort output; go to step 6041;

6041: end;

605: At end of output mode, notify the selected output device end of output; go to step 6041;

606: If the document output is graphics, text, image, execute the following steps:

6061: Setup the attributes of the drawing mode;

6062: Check if the document output needs clipping? if yes, go to step 6063; otherwise, execute step 6064;

6063: Set clipping area;

6064: Check if the document output is encrypted? If yes, go to step 6065; if not, go to step 6066;

6065: Decrypt the data of the document output;

6066: Determine the output type. There are several types: if it is polyline, rectangle, round rectangle, circle, ellipse, polygon, arc, chord, pie, curve, and pixel, etc. go to 607; If it is pure text, go to step 608; if it is image; execute step 609;

607: If it is polyline, rectangle, round rectangle, circle, ellipse, polygon, arc, chord, pie, curve, and pixels, go to step 6071:

6071: Request the selected output device to draw the graphic object using the specified pen and brush;

608: If it is pure text, execute the following steps:

6081: Check if the requested font is available for the selected output device? If yes, go to step 6082; If not, execute step 6083;

6082: Request the selected output device to draw the text using the specified font and character advance widths information;

6083: If the output device does not have the requested font, then decompress the black and white image of text output;

6084: Request the selected output device to output the pixels in specified text color or background color according to the image of the text;

609: If it is image, execute the following steps:

6091: Check if the selected output device need brush pattern? If yes, go to step 6092; If not, go to step 6093;

6092: Create brush with the pattern data for the selected output device;

6093: Check if the selected output device need source image? If yes, go to step 6094; if not, go to step 6095.

6094: Decompress the source image;

6095: Request the selected output device to set or stretch the source image to the specified output area.

The flow chart of the search system 130 is illustrated in FIG. 7. The local query processor initiates a search 701 when a user selects an output device from the listing and selecting interface. The search starts from the local database to check if there is any updated information about the selected output device 702. If found, the search result is returned to the caller 710 for providing information about the properties of the selected output device. If not found, the search query is forwarded to the remote query processor at the remote site 704 via the communication handler 705. The remote query processor receives the query and then starts the search at the remote site to get the information about the selected output device 706. The search result will then be returned 707. The communication handler will send the result back to the caller 705. After the query result is returned 708 from the remote site, the information about the selected output device will be returned to the caller 710 and at the same time updated in the database 709.

Figure 8:
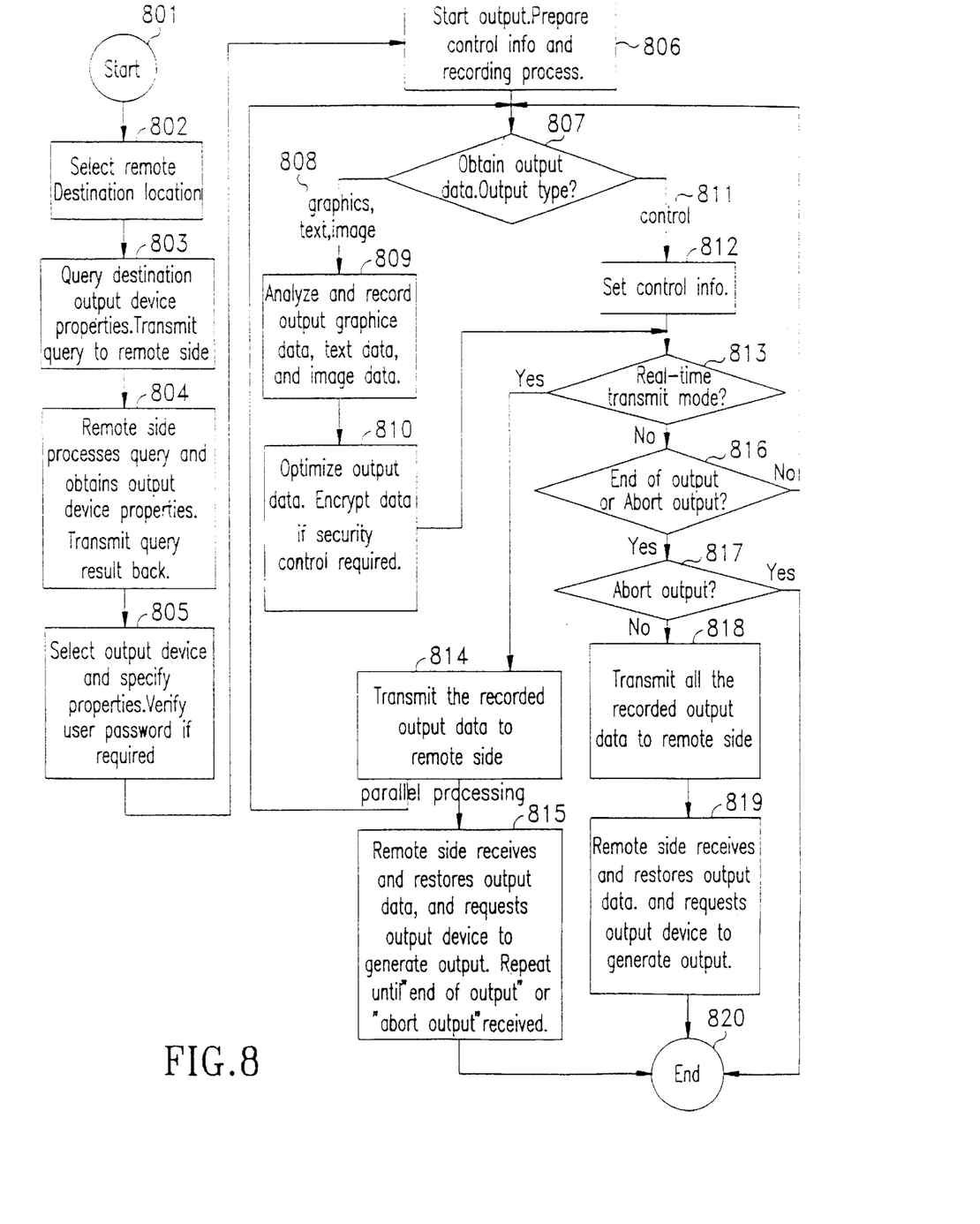
FIG. 8 is a flow chart showing the overall executions steps of the present invention.

To sum up, the method of the present invention is shown in FIG. 8.

801: Enable a user application program in a local host computer;

802: Select the location of an output device from the interface provided by the listing and selecting interface;

803: Search for the properties of the available output devices at the selected location; and transfer the query to the remote site;

804: The query is processed at the remote site for obtaining the properties of the selected output device; the result is then returned to the caller;

805: Select one proper output device and then specify the properties of the document output; If password verification is required, then confirm the user's password;

806: Start output, and prepare for the control information and recording process;

807: Obtain output data; and check the data type of the document output; if the document output is graphics, text, or images, go to step 808; If the output is control signal, go to step 811;

808: Go to step 809;

809: Analyze and record the document output data, such as graphics, text, and image data;

810: Optimize the document output data; Encrypt the document output data if security control is required; go to step 813;

811: Go to step 812;

812: Setup control data;

813: Check if it is real-time transmission mode? If yes, go to step 814; if not, go to step 816;

814: Transfer the recorded document output data to the remote site immediately; since it is parallel processing, execute step 806 and step 815 simultaneously;

815: The remote site receives and then restores the document output data. After the restoration process is complete, the selected output device is requested to generate the document output. Repeat this step until the selected output device receives "end of output" or "abort output" instruction. Go to step 820;

816: Check if the document output is terminated or aborted? If yes, execute step 817; if not, execute step 807;

817: Is the document output aborted? If not, execute step 818; If yes, execute step 820;

818: Transfer all the recorded document output data to the remote site;

819: The remote site receives and restores the document output data. After the document output data is restored, the selected output device is requested to generate the document output;

820: stop.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A system for a universal output driver for transferring a document output over a computer network, said computer network comprising a local host computer having a user application program, a remote host computer, and at least one output means coupled to said remote host computer, the system comprising:

means for listing and selecting an output means;

means for searching said selected output means in said local host computer in response to a select operation of said means for listing and selecting;

means for storing information about said selected output means;

means for searching said selected output means in said remote host computer and returning said search result to said means for listing and selecting;

means for analyzing and recording said document output provided in operative relation to said means for listing and selecting and said user application program;

means for optimizing said document output provided in operative relation to the means for analyzing and recording;

means for transferring the optimized document output to said remote host computer from said local host computer, irrespective of whether said output means is active; and means for restoring said optimized document output provided in operative relation to said selected output means.

2. The system as claimed in claim 1, further comprising:

means for providing settings and properties of said document output to said means for analyzing and recording.

3. The system as claimed in claim 1, wherein said means for optimizing compresses said document output.

4. The system as claimed in claim 1, wherein said means for optimizing encrypts said document output.

5. The system as claimed in claim 1, wherein said means for optimizing reduces a resolution of said document output to approximate a resolution supported by said selected output means.

6. The system as claimed in claim 1, wherein property settings of said document output are adaptable to at least one of printers, viewers, overhead projectors, and fax machines.

7. The system as claimed in claim 1, wherein said means for restoring decompresses said optimized document output if said optimized document output is compressed.

8. The system as claimed in claim 1, wherein said means for restoring decrypts said optimized document output if said optimized document output is encrypted.

9. A system for a universal output driver for transferring a document output over a computer network, said computer network comprising a local host computer having a user application program, a remote host computer, and at least one output means coupled to said remote host computer, the system comprising:

means for listing and selecting an output means;

means for searching said selected output means in said local host computer in response to a select operation of said means for listing and selecting;

means for storing information about said selected output means; and means for searching said selected output means in said remote host computer and returning said search result to said means for listing and selecting;

means for simulating a driver of the selected output means and processing said document output; and means for transferring the processed document output to said selected output means irrespective of a state of said selected output means.

10. The system as claimed in claim 9, wherein said means for simulating comprises:

means for analyzing and recording said document output provided in operative relation to said means for listing and selecting and said user application program; and means for restoring said processed document output.

11. The system as claimed in claim 9, wherein said means for simulating comprises:

means for optimizing said document output according to properties of said selected output means.

12. The system as claimed in claim 11, further comprising:

a search system for obtaining and returning information about said selected output means.

13. The system as claimed in claim 9, wherein said means for simulating comprises:

means for recording settings and properties of said document output.

14. A method for transferring a document output to an output device in a remote host computer without having to install a driver of said selected output device in a local host computer, the method comprising:

searching for said output device in said local host computer;

storing information about said output device; and searching for said output device in said remote host computer and returning a search result;

selecting the output device;

setting properties of said document output;

recording and analyzing data of said document output;

comparing properties of said selected output device with said properties of said document output;

optimizing said document output;

restoring the optimized document output in said remote host computer irrespective of a state of said selected output device; and transferring said optimized document output to said selected output device.

15. The method as claimed in claim 14, wherein said optimizing comprises:

compressing said document output.

16. The method as claimed in claim 14, wherein said restoring comprises:

decompressing said optimized document output if said optimized document output is compressed.

17. The method as claimed in claim 14, wherein said optimizing comprises:

changing a resolution of said document output based on a resolution provided by said output device.

18. The method as claimed in claim 14, further comprising:

searching for available output devices; and updating information regarding said available output devices.

19. The method as claimed in claim 14, further comprising:

if transferring is a real-time transmission, then parallel processing said document output.

20. The method as claimed in claim 14, wherein said optimizing comprises:

encrypting said document output.

21. The method as claimed in claim 14, wherein said restoring comprises:

decrypting said optimized document output if said optimized output is encrypted.

* * * * *